US012634301B2

(12) United States Patent
Shao et al.

(10) Patent No.: US 12,634,301 B2
(45) Date of Patent: May 19, 2026

(54) INLINE DETECTION OF HARDCODED CREDENTIALS ATTACK

(71) Applicant: Palo Alto Networks, Inc., Santa Clara, CA (US)

(72) Inventors: Rongbo Shao, San Jose, CA (US); Chien-Hua Lu, San Jose, CA (US); Kenneth Hsu, Campbell, CA (US); Hui Gao, Sunnyvale, CA (US); Shengming Xu, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 278 days.

(21) Appl. No.: 18/311,659

(22) Filed: May 3, 2023

(65) Prior Publication Data

US 2024/0372879 A1     Nov. 7, 2024

(51) Int. Cl.
*H04L 9/40*          (2022.01)

(52) U.S. Cl.
CPC ...... *H04L 63/1416* (2013.01); *H04L 63/1425* (2013.01); *H04L 63/1433* (2013.01); *H04L 63/20* (2013.01)

(58) Field of Classification Search
CPC ............. H04L 63/1416; H04L 63/1425; H04L 63/1433; H04L 63/20; H04L 63/0227; (Continued)

(56) References Cited

U.S. PATENT DOCUMENTS 9,699,203 B1 *   7/2017   Yang ..................... H04L 63/308
11,271,865 B1 *   3/2022   Haimovich ........... H04L 47/762
(Continued)

FOREIGN PATENT DOCUMENTS

CN          111107060 A   *   5/2020   ......... H04L 63/0428
CN          113709193 A       11/2021

OTHER PUBLICATIONS

English language translation of Chinese Patent CN-111107060-A (20 pages) (Year: 2019).*

(Continued)

*Primary Examiner* — Joseph P Hirl
*Assistant Examiner* — Thomas A Gyorfi
(74) *Attorney, Agent, or Firm* — GILLIAM IP PLLC

(57) ABSTRACT

A hardcoded credential attack detection and prevention system as disclosed herein distinguishes between legitimate uses and malicious uses to prevent attacks using hardcoded credentials without obstructing legitimate uses that still rely on hardcoded credentials. The system collects publicly disclosed hardcoded credentials and creates network traffic based signatures to detect login attempts corresponding to the publicly disclosed hardcoded credentials. The system then uses the created "login signatures" to detect login attempts corresponding to the hardcoded credentials. While detection with the login signatures occurs inline at individual network devices with visibility of the network traffic, the system obtains relevant network traffic from other network devices to analyze login behavior on a wider scale. This more informed analysis can be profiling, reputation scoring, and/or behavior analysis with the aggregate network traffic to detect malicious use of hardcoded credentials that would go undetected or result in a false positive.

20 Claims, 8 Drawing Sheets

(58) Field of Classification Search

CPC . H04L 63/0236; H04L 63/102; H04L 67/535;
H04L 63/083; H04L 63/105; H04L 63/14;
H04L 63/1408; G06F 21/316; G06F
21/552; G06F 21/566

See application file for complete search history.

(56) References Cited

U.S. PATENT DOCUMENTS

| | | | | |
|---|---|---|---|---|
| 2018/0007087 | A1* | 1/2018 | Grady | H04L 63/083 |
| 2018/0124082 | A1* | 5/2018 | Siadati | H04L 63/1425 |
| 2019/0158501 | A1 | 5/2019 | Peppe | |
| 2020/0195679 | A1* | 6/2020 | Du | H04L 63/1433 |
| 2020/0293638 | A1 | 9/2020 | Rose et al. | |
| 2022/0131844 | A1* | 4/2022 | Sherlock | H04L 63/105 |
| 2023/0037616 | A1* | 2/2023 | Karri | G06F 21/53 |
| 2023/0195863 | A1* | 6/2023 | Xu | H04L 63/107 |
| | | | | 726/22 |

OTHER PUBLICATIONS

David Freeman et al. "Who are You? A Statistical Approach to Measuring User Authenticity" (15 pages) (Year: 2016).*

"CWE-798: Use of Hard-coded Credentials", [online], [retrieved on Apr. 25, 2023] Retrieved from the Internet: <https://cwe.mitre.org/data/definitions/798.html>.

Hwang, et al., "Micro-Firewalls for Dynamic Network Security with Distributed Intrusion Detection", In Proceedings of IEEE International Symposium on Network Computing and Applications. NCA 2001, Oct. 8-10, 2001, 12 pages.

Verma, et al., "Hard-coded Credentials and Web Service in IoT: Issues and Challenges", International Journal of Computational Intelligence & IoT, Forthcoming, vol. 2 Issue 3, 2019, Mar. 22, 2019, 6 pages.

PCT Application No. PCT/US2024/027541, International Search Report & Written Opinion mailed Sep. 5, 2024, 13 pages.

PCT Application No. PCT/US2024/027541, Written Opinion of the IPEA mailed Mar. 28, 2025.

* cited by examiner

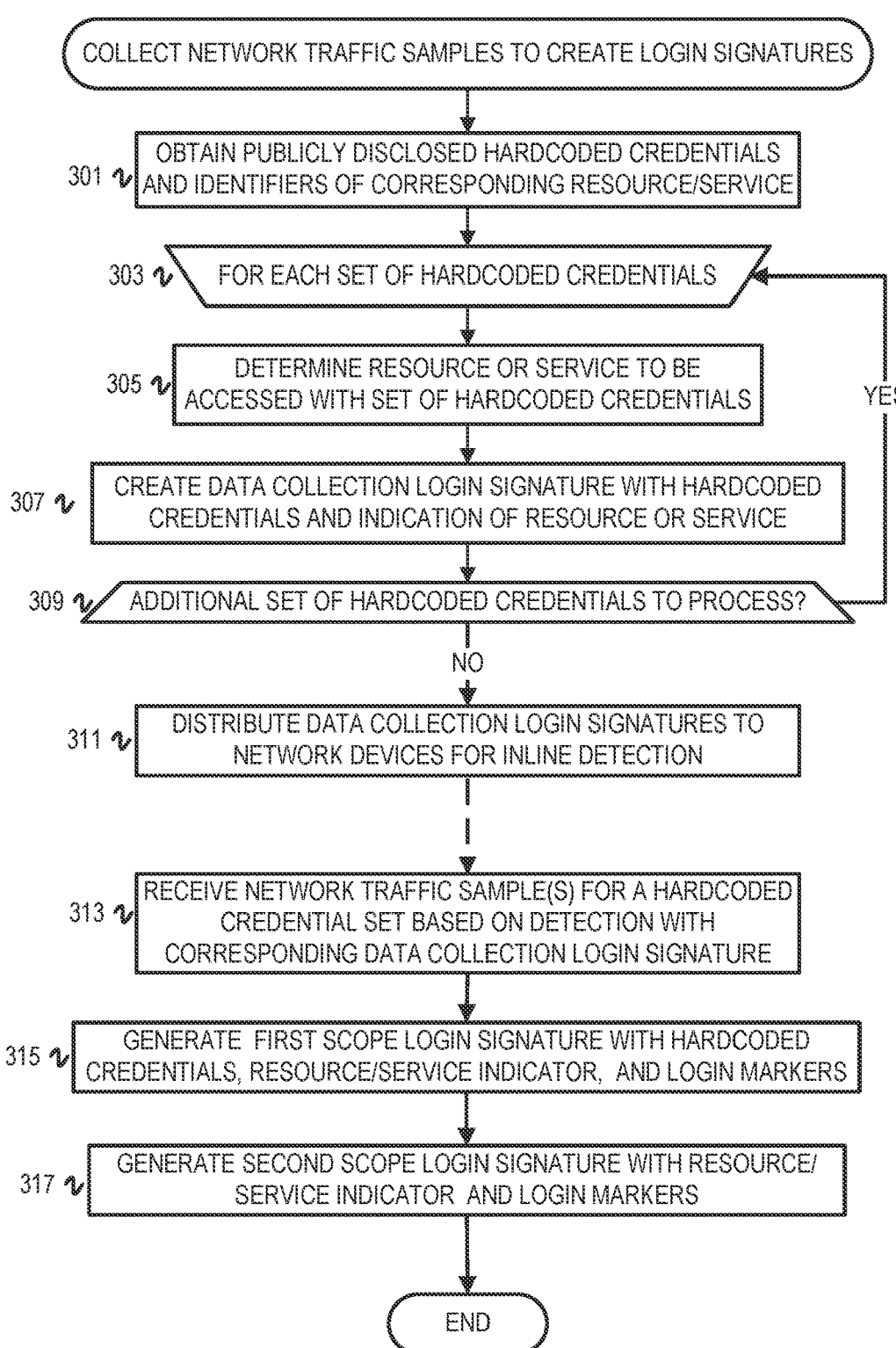

COLLECT NETWORK TRAFFIC SAMPLES TO CREATE LOGIN SIGNATURES

301 — OBTAIN PUBLICLY DISCLOSED HARDCODED CREDENTIALS AND IDENTIFIERS OF CORRESPONDING RESOURCE/SERVICE

303 — FOR EACH SET OF HARDCODED CREDENTIALS

305 — DETERMINE RESOURCE OR SERVICE TO BE ACCESSED WITH SET OF HARDCODED CREDENTIALS

307 — CREATE DATA COLLECTION LOGIN SIGNATURE WITH HARDCODED CREDENTIALS AND INDICATION OF RESOURCE OR SERVICE

309 — ADDITIONAL SET OF HARDCODED CREDENTIALS TO PROCESS?

YES

NO

311 — DISTRIBUTE DATA COLLECTION LOGIN SIGNATURES TO NETWORK DEVICES FOR INLINE DETECTION

313 — RECEIVE NETWORK TRAFFIC SAMPLE(S) FOR A HARDCODED CREDENTIAL SET BASED ON DETECTION WITH CORRESPONDING DATA COLLECTION LOGIN SIGNATURE

315 — GENERATE FIRST SCOPE LOGIN SIGNATURE WITH HARDCODED CREDENTIALS, RESOURCE/SERVICE INDICATOR, AND LOGIN MARKERS

317 — GENERATE SECOND SCOPE LOGIN SIGNATURE WITH RESOURCE/ SERVICE INDICATOR AND LOGIN MARKERS

END

FIG. 3

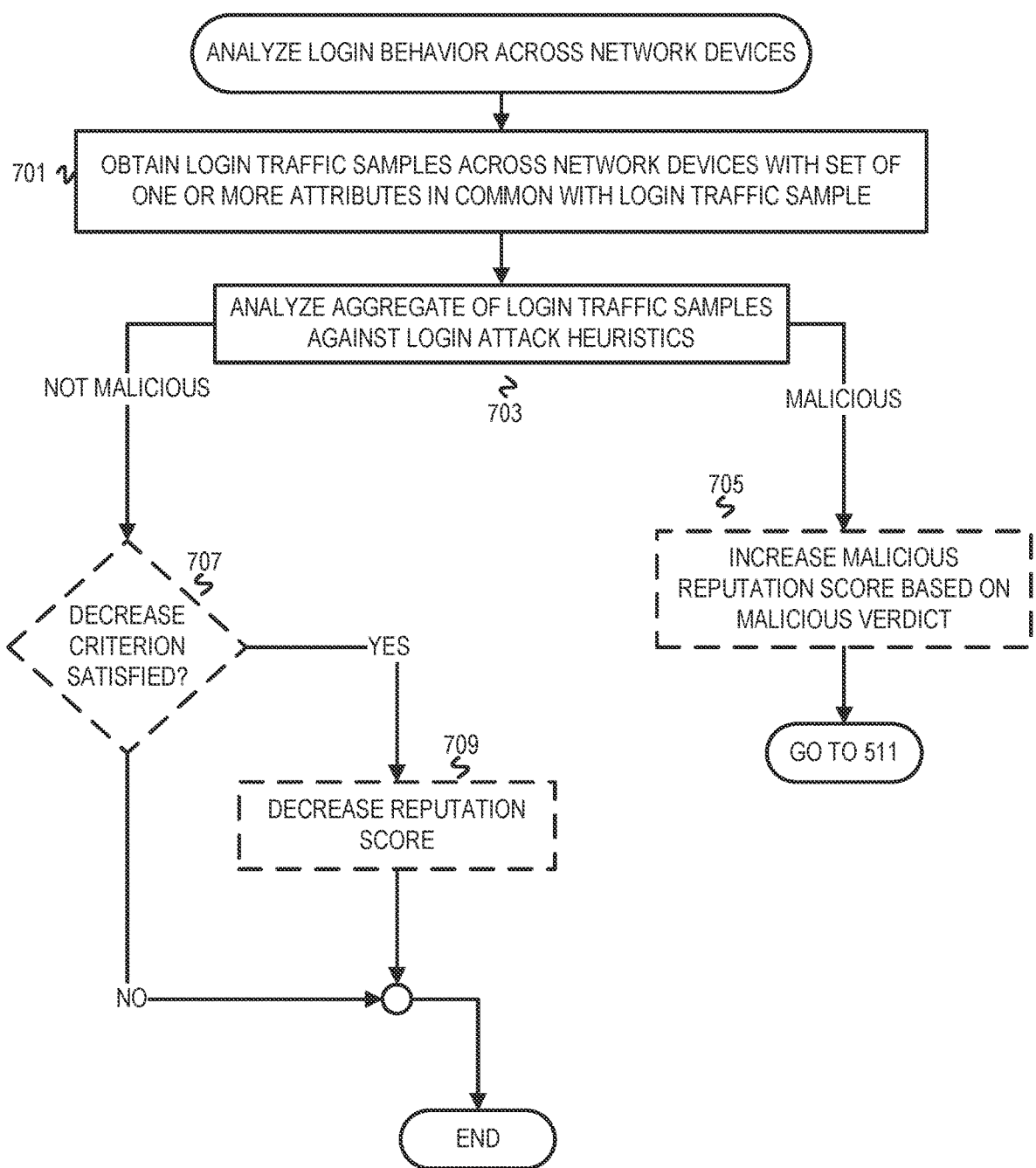

701 — OBTAIN LOGIN TRAFFIC SAMPLES ACROSS NETWORK DEVICES WITH SET OF ONE OR MORE ATTRIBUTES IN COMMON WITH LOGIN TRAFFIC SAMPLE

ANALYZE AGGREGATE OF LOGIN TRAFFIC SAMPLES AGAINST LOGIN ATTACK HEURISTICS

703

NOT MALICIOUS

MALICIOUS

707
DECREASE CRITERION SATISFIED?

YES

705
INCREASE MALICIOUS REPUTATION SCORE BASED ON MALICIOUS VERDICT

709
DECREASE REPUTATION SCORE

GO TO 511

NO

END

FIG. 7

INLINE DETECTION OF HARDCODED CREDENTIALS ATTACK

BACKGROUND

The disclosure generally relates to transmission of digital information (e.g., CPC class H04L) and a security arrangement for protecting computers, components thereof, programs or data against unauthorized activity (e.g., CPC subclass G06F 21/00).

Hardcoded/embedded credentials (also referred to as default credentials) is a userid/password pair that is built into or preinstalled in a product, such as an operating system or database. Default credentials are typically shared across instances of the product. While default credentials present a cybersecurity risk, they have multiple uses. Default credentials may be used for customer support, initial installation of software, initial device setup, and upgrades. A user may reset a device and use default credentials to access the reset device.

BRIEF DESCRIPTION OF THE DRAWINGS

Embodiments of the disclosure may be better understood by referencing the accompanying drawings.

FIG. 3 is a flowchart of example operations for collecting network traffic samples to create login signatures.

FIG. 7 is a flowchart of example operations for analyzing login behavior across network devices.

DESCRIPTION

The description that follows includes example systems, methods, techniques, and program flows to aid in understanding the disclosure and not to limit claim scope. Well-known instruction instances, protocols, structures, and techniques have not been shown in detail for conciseness. This description uses "login traffic" to refer to a network traffic sample or data traffic sample that includes a login request or login attempt.

Overview

Hardcoded credentials will often be published on a wide-escale (e.g., in a bulletin board or online community) and increase the existing risk of exploitation of these credentials. This has already occurred for Internet of Things (IoT) devices (e.g., Mirai botnet) and for operational systems (e.g., residential modems and automotive global positioning system (GPS) tracking devices). Regardless, hardcoded credentials continue to be used for legitimate purposes is ongoing.

A hardcoded credential attack detection and prevention system as disclosed herein distinguishes between legitimate uses and malicious uses to prevent attacks using hardcoded credentials without obstructing legitimate uses that still rely on hardcoded credentials. The system collects publicly disclosed hardcoded credentials and creates network traffic based signatures to detect login attempts corresponding to the publicly disclosed hardcoded credentials. The system then uses the created "login signatures" to detect login attempts corresponding to the hardcoded credentials. While detection with the login signatures occurs inline at individual network devices with visibility of the network traffic, the system obtains relevant network traffic from other network devices to analyze login behavior on a wider scale. This more informed analysis can be profiling, reputation scoring, and/or behavior analysis with the aggregate network traffic to detect malicious use of hardcoded credentials that would go undetected or result in a false positive.

Example Illustrations

Figure 1:
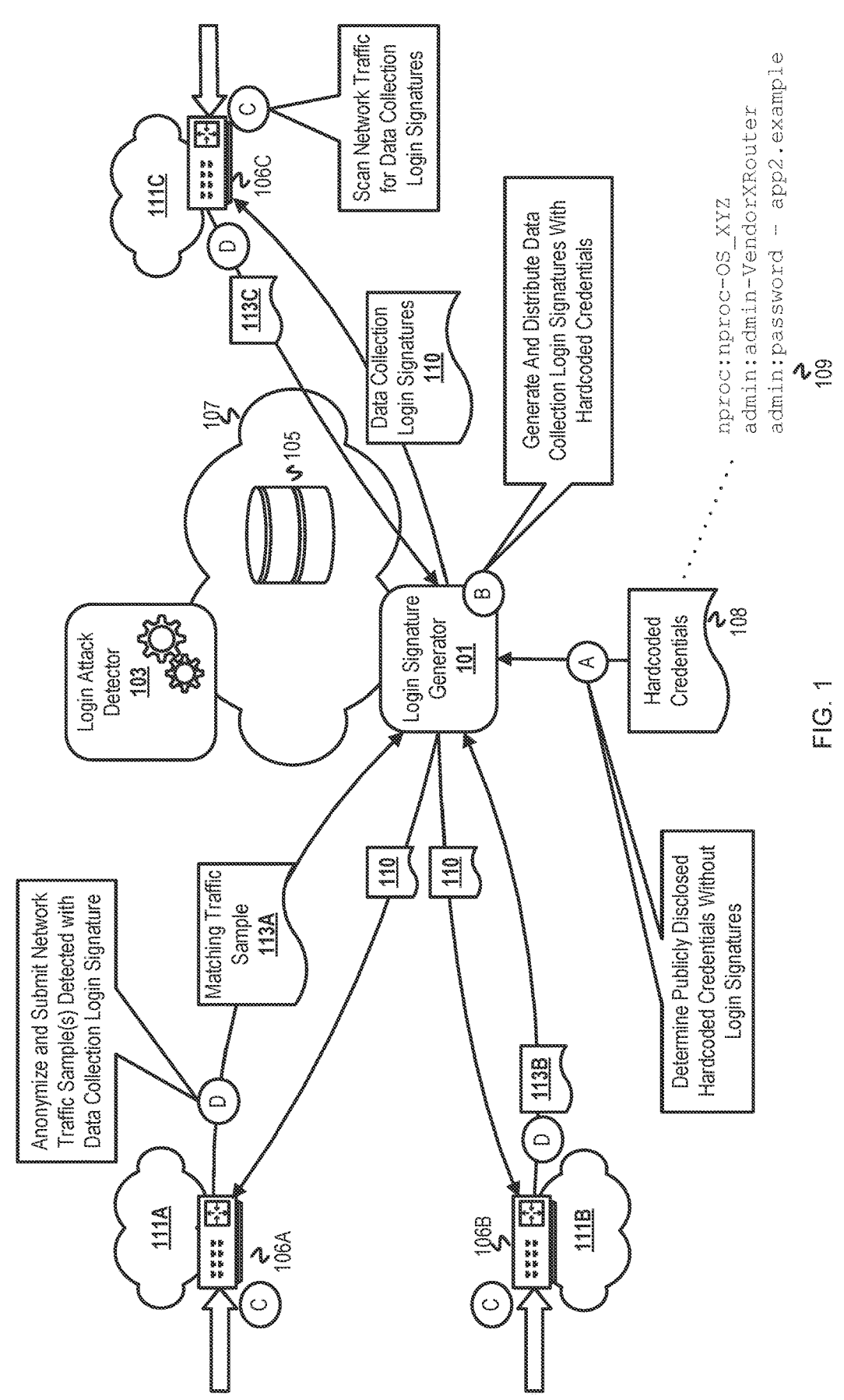
FIGS. 1-2 are example diagrams of a cyberattack detection and prevention system that distinguishes between legitimate and malicious uses of hardcoded credentials.
Figure 2:
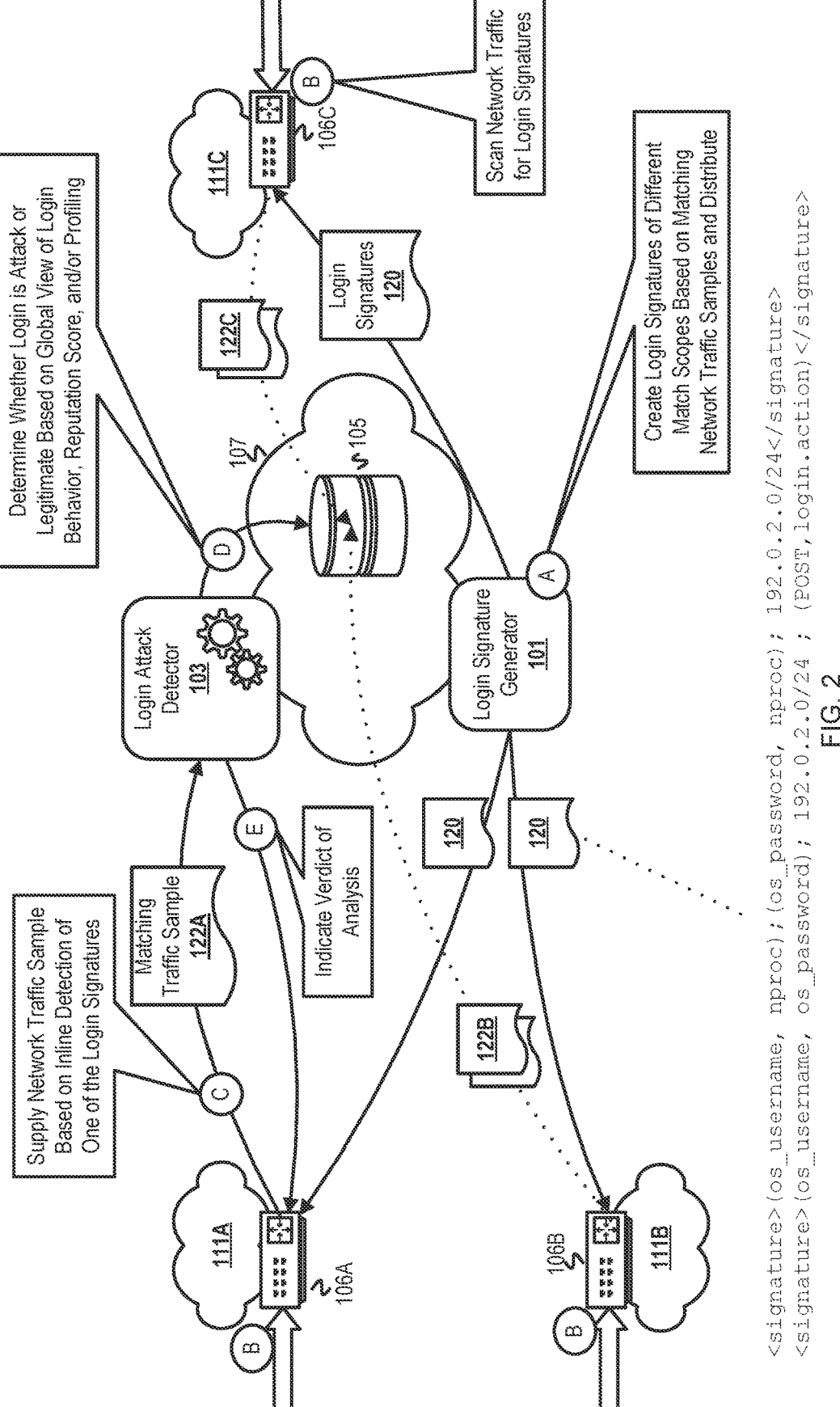

FIGS. 1-2 are example diagrams of a cyberattack detection and prevention system that distinguishes between legitimate and malicious uses of hardcoded credentials. FIG. 1 is an example diagram of the system collecting login traffic samples using hardcoded credentials for signature creation. FIG. 2 is an example diagram of the system deploying the created signatures and scanning traffic to detect login attempts of interest and performing an analysis based on multi-device and/or multi-network view of relevant login traffic. In both FIGS. 1 and 2, network devices 106A-106C are deployed at networks 111A-111C, respectively. A login attack detector 103 and a login signature generator 101 are accessible via a network 107. As an example, the login attack detector 103 and the login signature generator 101 can be provided as cloud-based services. The network 107 also provides access to a repository 105 in which login traffic samples are stored. The network devices 106A-106C can communicate with the login attack detector 103 and the login signature generator 101, for example as granted by license or subscription. Software on the network devices 106A-106C communicate with the login attack detector 103 and the login signature generator 101 according to a preferred paradigm, for example application programming interfaces (APIs) (e.g., remote procedure call (RPC) API, simple object access protocol (SOAP) API, representational state transfer (REST) API) or a proprietary application layer protocol.

Each of FIGS. 1-2 is annotated with a series of letters for stages that each represents one or more operations. FIG. 1 depicts stages A-D and FIG. 2 depicts stages A-E. Although these stages are ordered for this example, the stages illustrate one example to aid in understanding this disclosure and should not be used to limit the claims. Subject matter falling within the scope of the claims can vary from what is illustrated.

At stage A, the login signature generator 101 obtains publicly disclosed hardcoded credentials 108. In FIG. 1, examples of the hardcoded credentials 108 are depicted as username: password sets and their corresponding resource/service: nproc:nproc, admin:admin, and admin:password and respective resources/services indicators OS_XYZ, VendorXRouter, and app2.example. The login signature generator 101 may receive the hardcoded credentials according to a publish-subscribe paradigm, notifications, web crawling, etc. The login signature generator 101 obtains hardcoded credentials that lack login signatures for login attack detection and prevention. The login signature generator 101 maintains a list of hardcoded credentials for which login signatures have been created and filters, if necessary, obtained hardcoded credentials to yield those without login signatures.

At stage B, the login signature generator 101 generates and distributes data collection login signatures with the hardcoded credentials. To generate the data collection login signatures, the login signature generator 101 creates a file or data structure that network devices can use to find matching network traffic when scanning the traffic. As an example, the login signature generator 101 creates an extensible markup language (XML) file with tagging to delineate each data collection login signature and constituent components. The data collection login signature is an association of a set of hardcoded credentials (i.e., username and password) and one or more indications of a resource or service to be accessed with the hardcoded credentials (e.g., network or device address, uniform resource identifier (URI) or uniform resource locator (URL), etc.). Creation of data collection login signatures can be manual and/or automated based on templates that organize and format the obtained hardcoded credentials and resource/service indicators into data collection login signatures. The login signature generator 101 distributes generated data collection login signatures 110 to the network devices 106A-106C.

At stage C, the network devices 106A-106C scan inbound network traffic for the data collection login signatures 110. Since the components of a data collection login signature are likely at application layer, the traffic scanning would involve deep packet inspection.

At stage D, a network device that detects a data collection login signature in a network traffic sample captures the matching traffic and provides the matching traffic sample to the login signature generator 101. If a login is attempted using a hardcoded credential corresponding to one of the data collection login signatures 110, then the matching network traffic sample is communicated to the login signature generator 101. In FIG. 1, each of the network devices 106A-106C communicates a respective one of the matching traffic samples 113A-113C. A matching traffic sample would be protocol data units (e.g., packets, an application layer message) that correspond to the detected login request. For instance, a login encoded in a HyperText Transfer Protocol (HTTP) message.

At stage A of FIG. 2, the login signature generator 101 creates login signatures of different match scopes based on the matching network traffic samples from the network devices 106A-106C. A first scope of login signatures includes the hardcoded credentials, a login marker depending upon the protocol for accessing the corresponding assert or resources (e.g., a login keyword), and an indication of the service/resource. However, at least the password of a set of credentials may be obfuscated. Accordingly, the login signature generator 101 creates another version or set of login signatures with a wider matching scope, thus each hardcoded credential set will have at least two login signatures. The second login signature having a wider matching scope will include login signature components to detect a login request (e.g., keywords indicating a username and password being submitted) and the resource/service to be accessed. The first scoped login signature would match login traffic that is a login request with the hardcoded credentials and corresponding service/resource with high confidence. The second scoped login signature would match login traffic with lower confidence since at least one of the hardcoded credentials is not in the login signature. Unlike the data collection signatures, these login signatures are used to identify login requests for login attack analysis. After creating login signatures 120, the login signature generator 101 distributes the login signatures 120 to the network devices 106A-106C.

At stage B, the network devices 106A-106C scan network traffic for the login signatures 120. As with scanning for data collection login signatures 110, the login requests with components of a login signature are most likely in application layer data. Thus, the network devices 106A-106C scan application layer data for the login signatures 120. FIG. 2 depicts two login signatures for the hardcoded credentials nproc:nproc of the login signature 120. The first scoped login signature includes the credentials and login markers "os_username" and "os_password" and an Internet Protocol version 4 (IPv4) address of a resource to be accessed. The second scoped login signature includes the login markers of the first scoped login signature, additional login markers "POST" and "login.action", and the IPV4 address.

At stage C, the network device 106A detects one of the login signatures 120 while inline scanning network traffic and supplies a matching traffic sample 122A in which the login signature was detected to the login attack detector 103. As the network devices 106A-106C already scan for attack prevention and/or to enforce a security policy, scanning for the login signatures can be implemented with updating a repository of targets of scanning occurring on a per flow/session basis.

At stage D, the login attack detector 103 determines whether the detected login is a login attack or a legitimate login. The login attack detector 103 makes the determination with one or more different types of analysis at least some of which include analysis of login traffic detected at other network devices and/or historical login traffic detected at the network device 106A. The different types of analysis include login behavior analysis, reputation scoring, and profiling. The repository 105 hosts network traffic or data about the network traffic and can be queried for one or more attributes of the matching traffic sample 122A to obtain network traffic or network traffic data with a common attribute, such as a source network address. With this "global" view of login traffic, the login attack detector 103 analyzes behavior of login traffic with respect to login attack heuristics. Login traffic that facilitates the global view is provided by the network devices 106A-106C. As logins are detected with the login signatures 120, the network devices 106B-106C respectively provides matching traffic samples 122B-122C.

At stage E, the login attack detector 103 returns a verdict of the login attack analysis to the network device 106A. Based on the analysis, the login attack detector 103 will indicate a benign verdict (i.e., that the detected login is legitimate) or a malicious verdict (i.e., that the detected login is an exploitation of a hardcoded credentials login vulnerability).

Although depicted in separate figures, data collection and login attack analysis are not distinct phases but can occur concurrently. After an initial set of login signatures are installed, the scanning and attack analysis are not dependent upon data collection and login signature creation. Scanning traffic for attack analysis may be paused when login signatures are updated at network devices.

FIG. 3 is a flowchart of example operations for collecting network traffic samples to create login signatures. Description of FIG. 3 refers to a login signature generator as performing the operations for consistency with FIGS. 1-2.

At block 301, the login signature generator obtains publicly disclosed hardcoded credentials and identifiers of corresponding services/resources. Obtaining the hardcoded credentials can be periodic, event based, and/or manually initiated. The hardcoded credentials can be limited to those corresponding to resources or services of interest to a customer.

At block 303, the login signature generator begins iteratively processing each set of hardcoded credentials or hardcoded credentials pair to create a data collection login signature for the hardcoded credential set. The login signature generator traverses the list of hardcoded credentials that have been obtained and that lack corresponding data collection login signatures. In this flowchart, the iterative operations are represented by blocks 305 and 307.

At block 305, login signature generator determines a resource or service to be accessed with the set of hardcoded credentials. An identifier of the service/resource is likely extracted from data accompanying the obtained hardcoded credentials. An service/resource identifier does not necessarily identify a specific device. For instance, hardcoded credentials of a gateway or router of a vendor X may be used to access a particular model of the vendor X. Thus, the resource identifier could be the vendor name and/or a model identifier. Moreover, the resource/service identifier may not be explicitly indicated with the hardcoded credentials. To illustrate, a customer may indicate that it uses network devices of model 123 from vendor X. This may be indicated in a configuration file or via a user interface associated with the login signature generator. The login signature may search or subscribe for notifications of public disclosures of hardcoded credentials for vendor X. Thus, the resource/service identifier may be indicated in a parameter used in constructing registration or searching for the relevant hardcoded credentials.

At block 307, the login signature generator creates a data collection login signature with the hardcoded credentials and indication of the resource or service to be accessed. For instance, the login signature generator creates an XML file and inserts an object or entry for the data collection login signature. The object/entry includes a username component, a password component, and a component for the service/resource indicator. The login signature generator may also create the entry with components for login markers. The login signature generator can create a file for each data collection login signature or populate a file with multiple login signature entries/object.

At block 309, the login signature generator determines whether there is another hardcoded credential set to process. If not, then operational flow proceeds to block 311. If there is another hardcoded credential set to process, then operational flow returns to block 303.

At block 311, the login signature generator distributes the data collection login signatures to network devices for inline detection. The login signature generator will have established a trusted relationship with the recipient network devices (e.g., by license or subscription model). Alternatively, network devices can retrieve or request data collection login signature updates from the login signature generator.

Operational flow continues asynchronously to block 313 as represented by the dashed line in FIG. 3. At block 313, the login signature generator receives one or more network traffic samples for a hardcoded credential. When a data collection login signature is detected in login traffic at a network device, the network device can communicate the sample of login traffic to the login signature generator at each detection or after a configured number of detections. The network traffic sample which is login traffic or login traffic data for a login attempt/request would be application layer data (e.g., file transfer protocol (FTP) message).

At block 315, the login signature generator generates a first scope login signature with the hardcoded credential set, resource/service indicator, and login markers of the received network traffic sample. For instance, the first scope login signature would specify the hardcoded credential set, a protocol identifier, and login keywords.

At block 317, the login signature generator generates a second scope login signature with a resource/service indicator and login markers of the received network traffic sample. For instance, the second scope login signature would specify login keywords, a URI, and protocol message keywords/tags.

Figure 4:
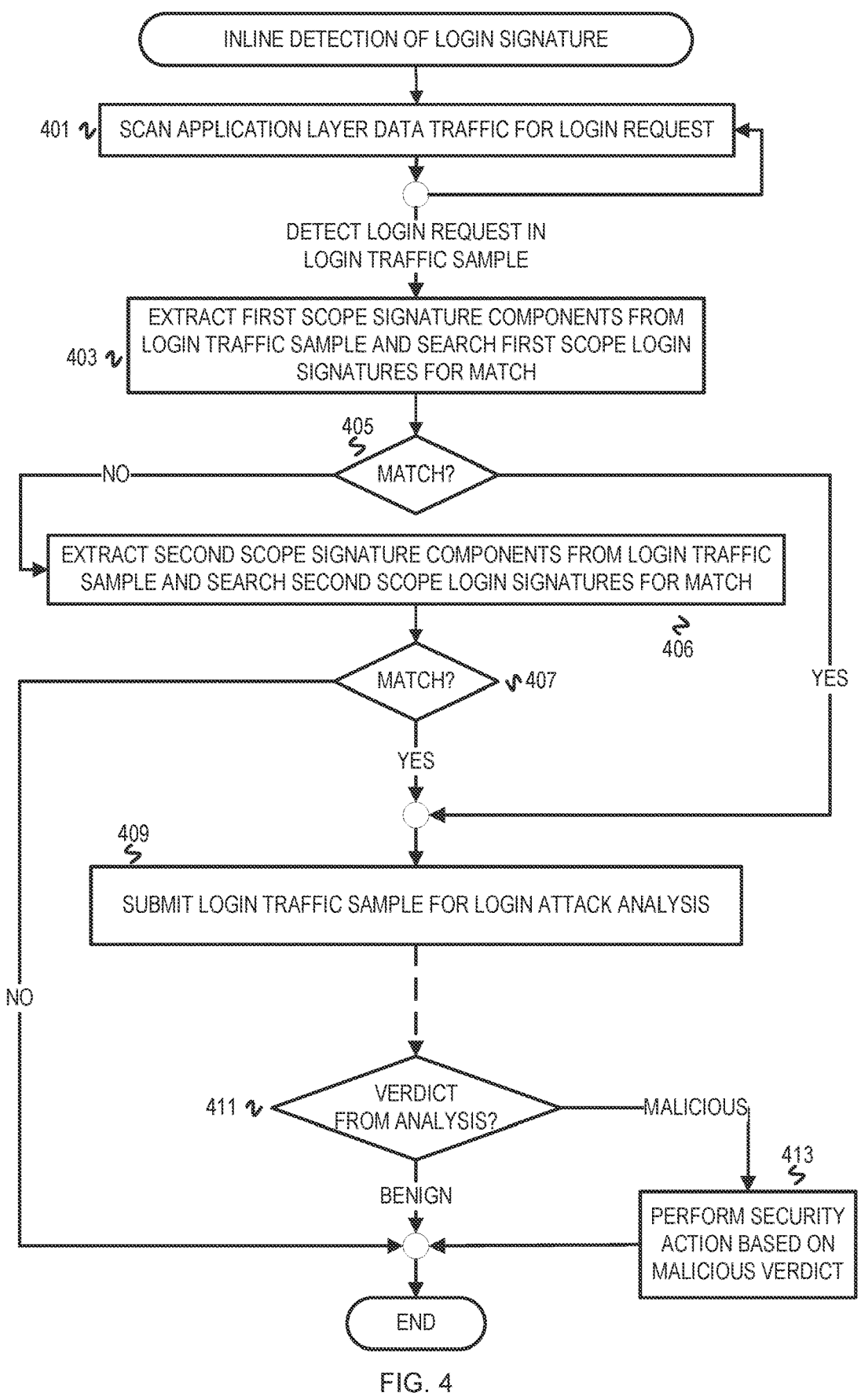
FIG. 4 is a flowchart of example operations for inline detection of a login signature.

FIG. 4 is a flowchart of example operations for inline detection of a login signature. The description of FIG. 4 refers to a network device as performing the operations for consistency with FIGS. 1-2. The network device would host scanning logic and the software to adapt or configure the scanning logic to scan for the login signatures.

At block 401, a network device scans application layer data traffic for a login request. Reference to network traffic refers to the aggregate of data traffic flowing through a network device which can be in different traffic flows. Scanning implemented on a network device can inspect network traffic at different ones of the communication layers, such as application layer and transport layer. Detection of a login request in network traffic will be based on inspection of application layer data, such as a FTP or HTTP message. And scanning occurs per flow (e.g., per connection between endpoints as defined by a source and destination at the application layer). Different application layer protocols may have common login markers in messages, but a traffic scanner can be configured/programmed to scan a traffic flow for login markers of a protocol determined for the flow. The network traffic scanning is ongoing as long as traffic flows through the network device. If a login request is detected in a login traffic sample, operational flow proceeds to block 403 (e.g., a thread is spawned for a function invoked resulting in a process distinct from a scanning process/thread). Otherwise, the network device continues scanning application layer data traffic for login requests.

At block 403, the network device extracts first scope signature components from the login traffic sample and searches first scope login signatures for a match. Configuration information or a first scope login signature definition will specify the fields or message components of a login traffic sample for the relevant login signature scope. These may be values in fields designated by keyword/tag, keywords/tags, or both. For the first scope login signatures, the extracted components will at least be the username and password values. The network device then searches the current list of first scope login signatures for a match based on the extracted components.

At block 405, the network device determines whether or not a match is found in the first scope login signatures. For instance, the network device determines whether a query into a repository of login signatures returns an empty value or an identifier of a hardcoded credential set and/or corresponding resource/service. If a match is found with a first scope login signature, operational flow proceeds to block 409. If a match is not found, then operational flow proceeds to block 406.

At block 406, the network device extracts second scope signature components from the login traffic sample and searches second scope login signatures for a match. The second scope login signatures allow for detecting login requests corresponding to hardcoded credential sets of interest without detecting a hardcoded credential set since the username and password may be encrypted. To preserve confidence in the detection, implementation can define second scope login signatures with more components. As mentioned previously, keywords and values for protocols, resources/service indicators, and script keywords can be included.

At block 407, the network device determines whether or not a match is found in the second scope login signatures. If a match is found with a second scope login signature, operational flow proceeds to block 409. If a match is not found, then operational flow ends. This presumes only two scopes of login signatures are being used. Embodiments can add other scopes depending upon a customer/user accepted strength of match confidence or tolerance for a greater number of false positives in login detection to be submitted to an analysis service or platform.

At block 409, the network device submits the login traffic sample for login attack analysis. Based on detection of the first or second scope login signature in the login traffic sample, the network device submits the login traffic sample by message or function call (e.g., by platform or SaaS defined API) for analysis to determine whether the login request is an exploitation of a hardcoded credential vulnerability or a legitimate login.

Operational flow continues asynchronously to block 411 as represented by the dashed line. At block 411, the network device determines whether a verdict from the login attack analysis is malicious or benign. After submitting the login traffic sample for analysis, the network device delays transmission of login request until the verdict is received. If the verdict is benign, then the network device no longer delays the login request and operational flow ends, while scanning continues (401). If the verdict indicates malicious, then operational flow proceeds to block 413.

At block 413, the network device performs a security action based on the malicious verdict. The malicious verdict indicates that the login request is likely an attack. The network device would perform a security action for detected hardcoded login attacks as defined in a security policy. This may be generating an alarm or notification, updating a visualization of attacks on a network, capturing the login traffic sample for further analysis, blocking all traffic from a same source, etc.

Figure 5:
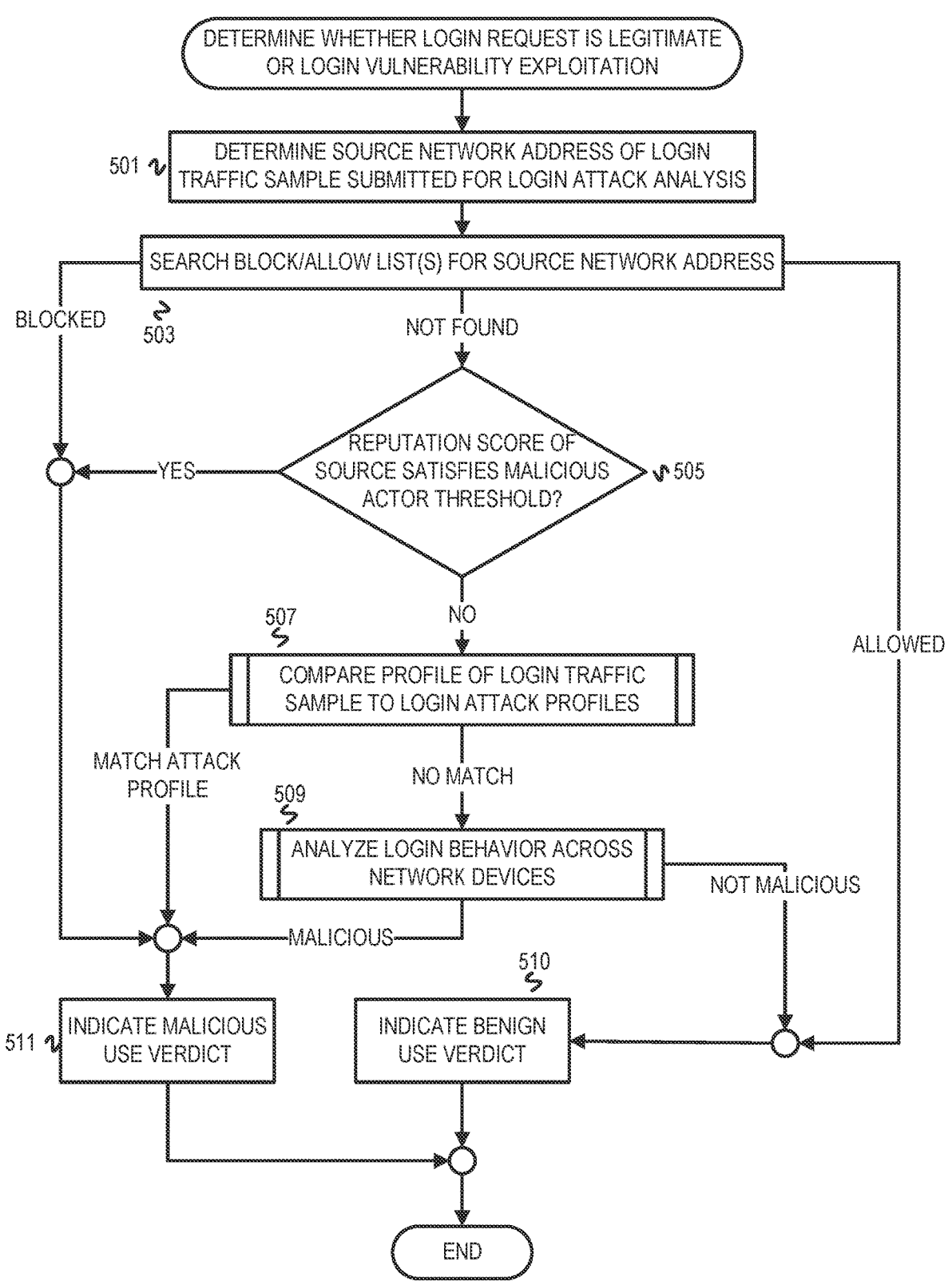
FIG. 5 is a flowchart of example operations for determining whether a login request is legitimate or exploitation of a hardcoded credential logon vulnerability.

FIG. 5 is a flowchart of example operations for determining whether a login request is legitimate or exploitation of a hardcoded credential login vulnerability. The description of FIG. 5 refers to a login attack detector as performing the operations for consistency with FIGS. 1-2. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

At block 501, a login attack detector determines a source network address of a login traffic sample submitted for login attack analysis. A network device has detected a login signature in the login traffic sample and submitted the login traffic sample for analysis. The login traffic sample may be a message formed from lower layer protocol data units (e.g., packets) or stored at a location accessible by the login attack detector and the network device. For example, the network device may store a login request from a network traffic sample in an online repository as a file and notify the login attack detector of the location (e.g., address and file name).

At block 503, the login attack detector searches a block/allow list(s) for the source network address. The platform/ service of the login attack detector may maintain a global (e.g., cross-customer) block list based on identification of malicious actors. With the block list, the login attack can quickly obtain a malicious verdict if the source network address of the login traffic sample is in the block list. A customer may share an allow list with the platform/service to allow for quickly obtaining a benign verdict, although this can likely be more effectively used at a customer's network perimeter. If the source address is found in a block list, then operational flow proceeds to block 511. If the source address is found in an allow list, then operational flow proceeds to block 510. If the source address is not found, operational flow proceeds to block 505.

At block 505, the login attack detector determines whether a reputation score of the source address satisfies a malicious actor threshold. For an implementation that quantifies suspicion/risk with a higher reputation score, a reputation score would satisfy a malicious actor threshold when it equals or exceeds (depending upon implementation of the threshold as inclusive) the malicious actor threshold. This effectively represents that the accumulation of observed activities or behavior associated with the source address has resulted in suspicion or risk that is considered malicious. The reputation score is updated based on observed login behavior, corresponding to block 509. Thus, previously determined malicious login behavior by a source address is reflected in the reputation score. If a reputation score satisfies the malicious actor threshold, then previous login behavior analysis indicated a login attack and another analysis of login behavior can be bypassed. If the reputation score satisfies the malicious actor threshold, then operational flow proceeds to block 511. If the reputation score does not satisfy the malicious actor threshold, then operational flow proceeds to block 507.

Figure 6:
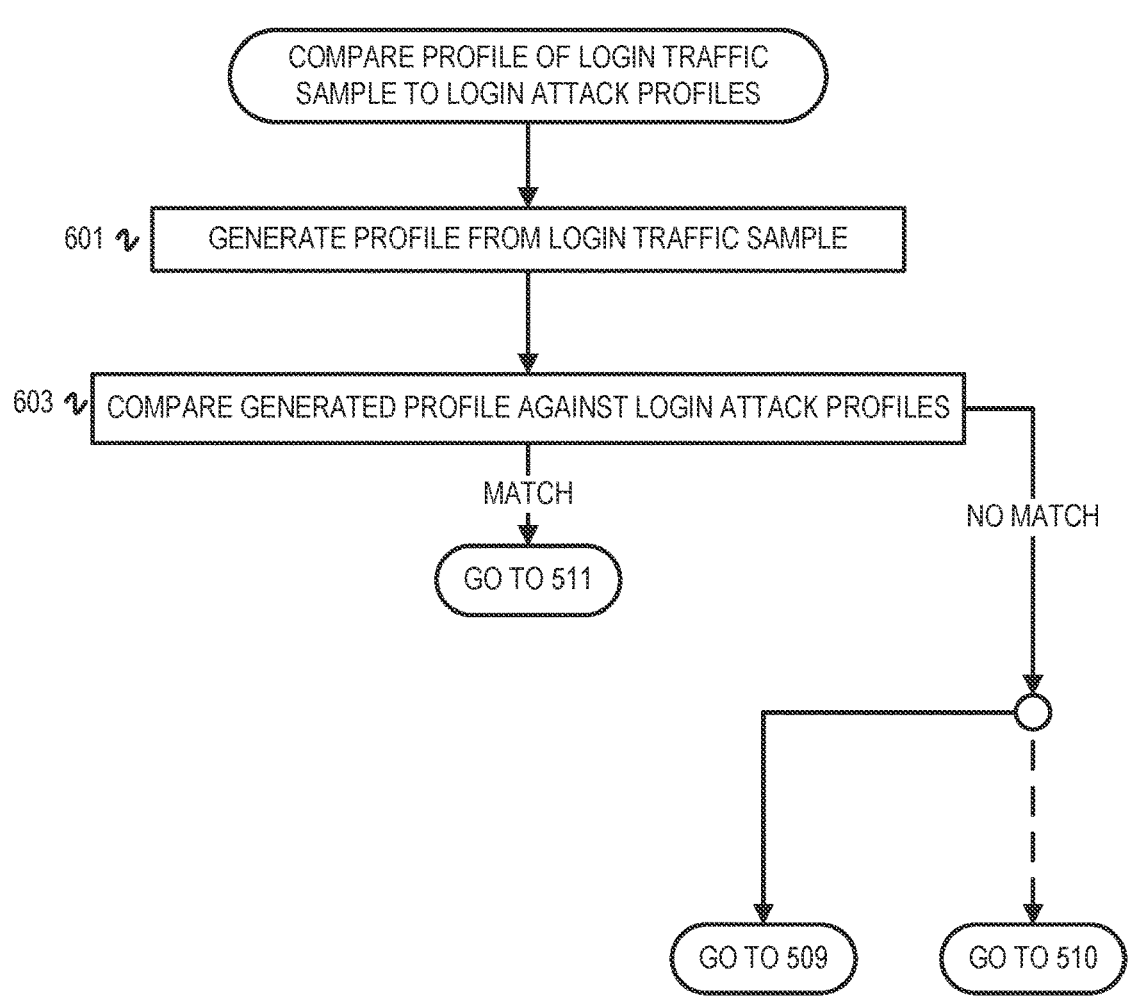
FIG. 6 is a flowchart of example operations for comparing a profile of the login traffic sample against login attack profiles.

At block 507, the login attack detector compares a profile or fingerprint of the login traffic sample to login attack profiles. More detailed example operations are depicted in FIG. 6. If the profile comparison yields a match against a login attack profile, operational flow proceeds to block 511. If not, then operational flow proceeds to block 509.

At block 509, login attack detector analyzes login behavior across network devices. Analyzing login behavior across network devices provides view of behavior relevant to the login traffic sample across a network or networks. Depending upon user preference and allowances, the analysis can be across networks of different customers. More detailed example operations are depicted in FIG. 7. If the login behavior analysis determines the behavior is malicious, then operational flow proceeds to block 511. If the login behavior analysis determines the behavior is not malicious, then operational flow proceeds to block 510.

Results of the analysis are indicated at blocks 510 and 511. At block 511, the login attack detector indicates a malicious use verdict. At block 510, the login attack detector indicates a benign use verdict. The login attack detector can generate a message or notification indicating the verdict and identifying attributes of the login traffic sample for communication to the network device that submitted the login traffic sample for analysis.

FIG. 6 is a flowchart of example operations for comparing a profile of the login traffic sample against login attack profiles. Description of the example operations refer to the login attack detector as performing the operations. At block 601, the login attack detector generates a profile from the login traffic sample. The different login attack profiles may have varying constituent components. Thus, the login attack generator may create multiple profiles for each login attack profile with different constituent fields/components. For instance, login attack profiles may vary by protocol (e.g., HTTP, FTP). The login attack detector extracts values of components defined for the profile. Example components that would form a profile or fingerprint include user-agent, platform, and product. Further, a login attack profile can also include the components of the login signature. At block 603, the login attack detector compares the generated profile against the login attack profiles to determine whether there is a match. If there is a match with a login attack profile, then operational flow proceeds to block 511. If there is no match, then operational flow proceeds to block 509 or 510 depending upon implementation.

FIG. 7 is a flowchart of example operations for analyzing login behavior across network devices. To distinguish between a legitimate use of a hardcoded credential set and a login attack with a hardcoded credential set, analysis of login traffic at different entrance points to a network and/or of multiple networks is examined against login attack heuristics. Description of the example operations refer to the login attack detector as performing the operations. Example operations represented by blocks 705, 707, and 709 correspond to operations that relate to maintaining a reputation score of a source network address of the login traffic sample based on the login behavior analysis. The example operations correspond to an implementation that reflects greater risk or suspicion with a greater reputation score. However, these operations are optional and thus depicted in dashed lines.

At block 701, the login attack detector obtains login traffic samples across network devices with a set of one or more attributes in common with login traffic sample. As login traffic is detected with login signatures, a repository of login traffic is updated to provide visibility of activity across entrance points of a network or entrance points of multiple networks. The login attack detector queries the repository for login traffic samples with one or more attributes of the login traffic sample submitted for analysis. For example, the login attack detector queries for login traffic samples with a same source network address as the login traffic sample. Since different login attack heuristics may align with different common attributes, the login attack detector can submit different queries to obtain different sets of login traffic samples for analysis. In addition to network addresses and account identifiers, other examples of attributes that may be common across an attack or intrusion include domain names, HTTP message elements (e.g., a user-agent, query string in a message header, etc.), and service identifiers.

At block 703, the login attack detector analyzes the aggregate of login traffic samples against login attack heuristics. The login attack heuristics are encodings of characteristics of login attacks that have been observed. The encodings of characteristics can be a set of conditional statements used collectively to determine presence of the characteristics in a login traffic sample being analyzed. Below are examples of login attack heuristics.

Login attack heuristic 1: multiple login attempts from a same source address

Login attack heuristic 2: multiple login attempts for a same account

Login attack heuristic 3: multiple login attempts from a same source address for different accounts Login attack heuristic 4: multiple login attempts from different source addresses While these examples relate to login attempts, attack heuristics, embodiments are not limited thereto. An attack heuristic may be a threshold number of service requests within a time window regardless of requestor or source address. Another heuristic may be multiple request messages from different addresses and/or accounts that correspond to a same domain. If the login traffic sample does not have the characteristics indicated in any of the login attack heuristics, then the login attempt is determined to be not malicious and operational flow proceeds to block 707. Otherwise, the login attempt is determined to be malicious.

At block 705, the login attack detector increases the reputation score of the source network address of the login traffic sample being analyzed based on the determination of malicious login behavior. The reputation score would be increased by a constant based on a malicious login behavior determination. Embodiments may use heuristics of different degrees of risk or suspicion and thus increase a reputation score proportionally. Operational flow proceeds from 705 to 511.

At block 707, the login attack detector determines whether a decrease criterion is satisfied. Decreasing the reputation score to reflect an increase in trustworthiness may be done to recover typically trusted nodes used in attacks, such as a command-and-control attack. The criterion may be a time period or number of not malicious results for the source address. To determine whether the criterion is satisfied, a state would be maintained for a reputation score. The state will depend upon the criterion. For example, if the criterion is time based, then the state would indicate a time when the reputation score was most recently adjusted to reflect a malicious determination. As another example, if the criterion is based on number of logins analyzed for a network address, then the state would be a counter. If the decrease criterion is not satisfied, then operational flow ends since the reputation score is not to be changed, and operational flow returns to the calling or encompassing program code (e.g., continues to block 510 of FIG. 5). If the criterion is satisfied, then operational flow proceeds to block 709 (e.g., continues to block 510 of FIG. 5).

At block 709, the login attack detector decreases the reputation score based on reputation score state. As with increasing, decreasing the reputation will depend upon implementation (e.g., constant value decrease or proportional decrease with respect to detected behavior). Operational flow ends after block 709 (e.g., continues to block 510 of FIG. 5).

Variations

Embodiments may anonymize at least some data in login request network traffic samples communicated or supplied from scanning network devices. This may be done to comply with privacy laws and/or satisfy customer concerns of privacy or data leakage. An agent or process at a network device scanning for login signatures obfuscates a sample(s) or specified fields of a sample (e.g., the username and password fields) according to an obfuscation paradigm established between the scanning network devices and the cybersecurity platform or cybersecurity provider that generates login signatures and analyzes samples. The obfuscation paradigm may be defined by customer and/or jurisdiction of the sample source. For instance, the platform/provider may use public key cryptography with different private keys per customer to obfuscate the data. As another example, anonymization may be limited to source or customer identification and not necessarily the data traffic. As an example, information identifying a scanning network device or organization owning the network device would be replaced with a generic identifier that allows distinguishing traffic flows without identifying a customer or address of a scanning network device.

The example description refers exploitation of hardcoded credentials to the pervasiveness of the vulnerability. However, embodiments are not limited to this vulnerability and are not limited to evaluating login traffic and login attempts. Network traffic across different security devices/components (e.g., different firewalls, gateways, etc.) can be analyzed to detect attempted attacks without being limited to login attempts. As one example, a login attempt may initiate the aggregate view analysis (e.g., analysis of traffic traversing different security devices/components or traffic traversing different private network perimeters), but other network traffic without login markers and/or not including login traffic can be collected and analyzed based on a common traffic attribute that is independent of login. Moreover, a login attempt is not necessary to trigger the aggregate traffic analysis. In addition or instead of scanning for login signatures, a security appliance (hardware or software) can be programmed to scan for other signatures or markers. As an example, a scanner can be programmed to scan for a service identifier or domain identifier and then begin aggregate traffic analysis. Embodiments are also not limited to aggregate traffic analysis being dependent upon scanning for a marker or signature. For instance, detection of a threat signature or discovered attack can initiate aggregate traffic analysis. Analysis would extract different attributes of the traffic in which the attack or threat signature was detected and obtain traffic with at least some of those attributes in common to collect the traffic for aggregate analysis.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, an implementation may concurrently search for the different scopes of login signatures corresponding to blocks 403 and 406. As another example, the operations depicted in blocks 505, 507, and 509 are not necessarily all performed. If multiple of the operations represented by blocks 505, 507, 509 are performed, they can be performed concurrently. In addition, the operation represented by block 503 is not necessary and depends upon whether an allow/block list is defined at the platform or service providing the cybersecurity analysis. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 8:
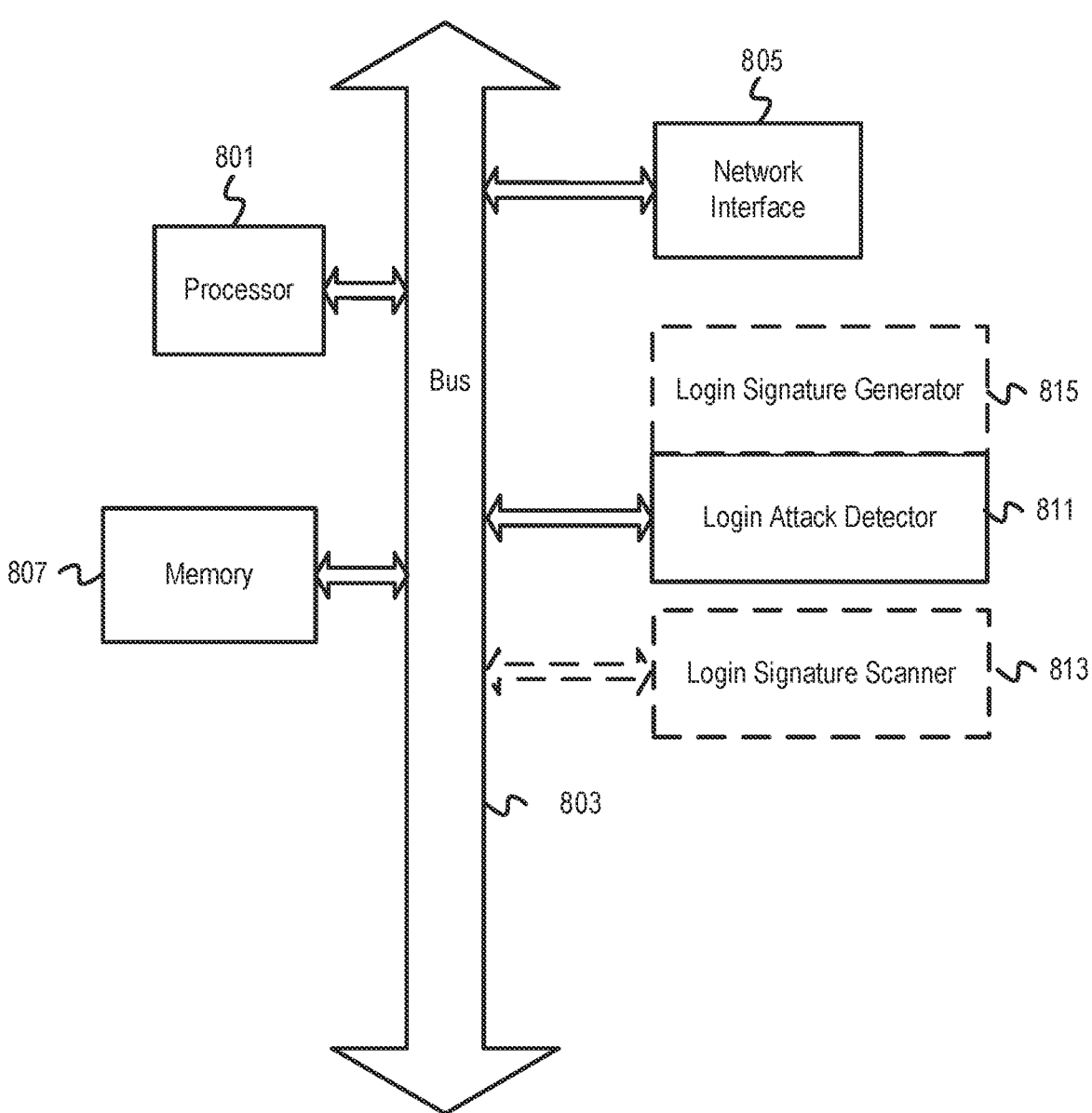
FIG. 8 depicts an example computer system with a login attack detection and prevention components.

FIG. 8 depicts an example computer system with a login attack detection and prevention components. The computer system includes a processor 801 (possibly including multiple processors, multiple cores, multiple nodes, and/or implementing multi-threading, etc.). The computer system includes memory 807. The memory 807 may be system memory or any one or more of the above already described possible realizations of machine-readable media. The computer system also includes a bus 803 and a network interface 805. The system also includes a login attack detector 811, a login signature generator 815, and a login signature scanner 813. Although a system may have all components/functionality corresponding to these components, an expected implementation will at least have other login signature scanners deployed to collect data and scan traffic across one or more networks and communicate with the login attack detector 811. Also, it is not necessary for the login signature generator 815 and the login attack detector 811 to be hosted on a same device, but both may be part of a same system. While the login signature scanner 813 could be implemented as a distinct network traffic scanner, implementations can also adapt existing traffic scanners to scan for login signatures and communicate login traffic samples to the login attack detector 811 and the login signature generator 815. The login attack detector 811 distinguishes between a legitimate and a malicious attempted login corresponding to hardcoded credentials for which a signature has been detected. The login signature generator 815 generates login signatures for data collection and for attack analysis. The login signature generator 815 can also provide a user interface for a user to select components of a login traffic sample to form login signatures of different match scopes. Any one of the previously described functionalities may be partially (or entirely) implemented in hardware and/or on the processor 801. For example, the functionality may be implemented with an application specific integrated circuit, in logic implemented in the processor 801, in a co-processor on a peripheral device or card, etc. Further, realizations may include fewer or additional components not illustrated in FIG. 8 (e.g., video cards, audio cards, additional network interfaces, peripheral devices, etc.). The processor 801 and the network interface 805 are coupled to the bus 803. Although illustrated as being coupled to the bus 803, the memory 807 may be coupled to the processor 801.

Terminology

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The invention claimed is:
1. A method comprising:
scanning first network traffic transmitted via a first network device against at least a first login signature and a second login signature having a wider scope than the first login signature, wherein the first login signature comprises at least login credentials and a resource identifier or service identifier and the second login signature comprises a subset of the login credentials, the resource identifier or service identifier, and at least one additional login marker,
wherein the login credentials comprise default credentials or hardcoded credentials,
wherein the resource identifier identifies a device or software that has default credentials or hardcoded credentials,
wherein the service identifier identifies a cloud-based service that has default credentials or hardcoded credentials;
detecting a login request in a first subset of the first network traffic based, at least in part, on matching the first subset of the network traffic to either the first login signature or the second login signature;
determining whether the login request is legitimate or suspicious, wherein determining whether the login request is legitimate or suspicious comprises at least one of,
determining whether a profile generated from the first network traffic subset matches an attack profile;
determining whether behavior determined from second network traffic and the first network traffic subset is suspicious, wherein the second network traffic has at least one attribute in common with the first network traffic subset; and

determining whether a reputation score of a first network address indicated as a source address of the first network traffic subset satisfies a malicious actor threshold; and
indicating a verdict based on the determination of whether the login request is legitimate or suspicious.
2. The method of claim 1 further comprising:
scanning the second network traffic for a plurality of credentials identified as susceptible to exploitation;
based on detecting a first of the plurality of credentials, capturing a subset of the second network traffic that includes the first credentials; and
generating the first login signature and the second login signature based, at least in part, on the captured subset of the second network traffic.
3. The method of claim 2, wherein generating the first login signature comprises determining from the captured subset of second network traffic a resource or service identifier corresponding to the first credentials and indicating the resource or service identifier in association with the first credentials as the first login signature.
4. The method of claim 3 further comprising generating the second login signature based, at least in part, on the captured subset of second network traffic, wherein generating the second login signature comprises determining from the captured subset of second network traffic a set of one or more login markers in a login request or login response of the captured subset of second network traffic and indicating as the second login signature the set of login markers in association with the resource or service identifier.
5. The method of claim 1, further comprising capturing the first network traffic subset and submitting the captured first network traffic subset from the first network device to a cloud-based cybersecurity service for the determination of whether the login request is legitimate or suspicious.
6. The method of claim 1, wherein determining whether the login request is legitimate or suspicious further comprises determining whether a source network address of the first network traffic subset is specified as allowed or trusted or specified as blocked.
7. The method of claim 1 further comprising:
obtaining the second network traffic based, at least in part, on querying for login network traffic of multiple network devices having the at least one attribute in common with the first network traffic subset, wherein the at least one common attribute is the first network address,
wherein determining whether the behavior is suspicious comprises determining at least one of whether the second network traffic indicates login attempts for multiple different accounts from the first network address with login credentials corresponding to the login request of the first network traffic subset, whether the second network traffic indicates multiple login attempts from the first network address for a same entity, and whether the second network traffic and third network traffic indicates multiple login attempts for a same entity from the first network address and a second network address indicated as a source address in the third network traffic.
8. The method of claim 1 further comprising maintaining the reputation score of the first network address based on behavioral analysis of network traffic that indicates the first network address as a source address, wherein the behavioral analysis comprises evaluating the network traffic that indicates the first network address as a source address against heuristics of malicious or suspicious login attempts.

9. A non-transitory, machine-readable medium having program code stored thereon, the program code comprising instructions to:

scan first network traffic against a plurality of login signatures of different scopes generated based on hard-coded credentials or default credentials of services or resources, wherein the plurality of login signatures corresponds to at least one of a device that has default credentials or hardcoded credentials, software that has default credentials or hardcoded credentials, and a cloud-based service that has default credentials or hardcoded credentials, wherein at a first of the plurality of login signatures comprises at least login credentials and a resource identifier or service identifier and a second of the plurality of login signature comprises a subset of the login credentials, the resource identifier or service identifier, and at least one additional login marker, wherein the login credentials comprise default credentials or hardcoded credentials, wherein the resource identifier identifies a device or software that has default credentials or hardcoded credentials, wherein the service identifier identifies a cloud-based service that has default credentials or hardcoded credentials;

determine whether a login request detected in the first network traffic based on matching the first or the second login signature is legitimate or an exploitation of a login vulnerability, wherein the instructions to determine whether a login request detected in first network traffic is legitimate or an exploitation of a login vulnerability comprise at least one of, instructions to determine second network traffic across multiple network devices having at least one attribute in common with the first network traffic and to determine whether login behavior of the first network traffic and the second network traffic has specified characteristics of a login attack;

instructions to determine whether a reputation score of a source network address of the first network traffic satisfies a malicious actor threshold, wherein the reputation score is based on login behavior of network traffic of the source network address; and instructions to determine whether a profile generated from the first network traffic matches a login attack profile; and generate a security verdict corresponding to the login request based, at least in part, on the determination of whether the login request is legitimate or an exploitation of a login vulnerability.

10. The non-transitory, machine-readable medium of claim 9, wherein the instructions to determine whether the login behavior has specified characteristics of a login attack comprise instructions to determine at least one of whether the login behavior indicates login attempts for multiple different entities from the source network address with login credentials corresponding to the detected login signature, whether the login behavior indicates multiple login attempts from the source network address for a same entity, and whether the login behavior of the first and second network traffic and login behavior of third network traffic indicates multiple login attempts for a same entity from a source network address of the second and third network traffic and a second source network address indicated as a source address for the third network traffic.

11. The non-transitory, machine-readable medium of claim 9, wherein the program code further comprises instructions to maintain reputation scores of source network addresses of network traffic in which one of a plurality of login signatures was detected.

12. The non-transitory, machine-readable medium of claim 11, wherein the instructions to maintain reputation scores comprise instructions to update a reputation score of a network address to improve or degrade reputation as represented by the reputation score based on login behavior of network traffic observed for the network address.

13. The non-transitory, machine-readable medium of claim 9, wherein the program code further comprises instructions to:

scan the second network traffic for a plurality of credentials identified as hardcoded or default credentials susceptible to exploitation;

based on detecting a first of the plurality of credentials, capture a subset of the second network traffic that includes the first credentials; and generate the first login signature and the second login signature based, at least in part, on the captured subset of the second network traffic.

14. The non-transitory, machine-readable medium of claim 13, wherein the instructions to generate the first login signature comprise instructions to determine from the captured subset of second network traffic a resource or service identifier corresponding to the first credentials and indicate the resource or service identifier in association with the first credentials as the first login signature.

15. The non-transitory, machine-readable medium of claim 14, wherein the program code further comprises instructions to generate the second login signature based, at least in part, on the captured subset of second network traffic, wherein the instructions to generate the second login signature comprise instructions to determine from the captured subset of second network traffic a set of one or more login markers in a login request or login response of the captured subset of second network traffic and indicate as the second login signature the set of login markers in association with the resource or service identifier.

16. A system comprising:

a first network device having a first processor and a first machine-readable medium having instructions stored thereon that are executable by the first processor to cause the first network device to, scan network traffic handled by the first network device for one of a plurality of login signatures corresponding to a login request, wherein the plurality of login signatures comprises a first and second login signatures having different scopes of matching, wherein the first of the plurality of login signatures comprises at least login credentials and a resource identifier or service identifier and the second of the plurality of login signatures comprises a subset of the login credentials, the resource identifier or service identifier, and at least one additional login marker, wherein the login credentials comprise default credentials or hardcoded credentials, wherein the resource identifier identifies a device or software that has default credentials or hardcoded credentials, wherein the service identifier identifies a cloud-based service that has default credentials or hardcoded credentials;

based on the scanning detecting one of the plurality of login signatures, submit the corresponding subset of network traffic having the detected login signature for determination of whether the corresponding login request is legitimate or an exploitation of a login vulnerability;

a second device having a second processor and a second machine-readable medium having instructions stored thereon that are executable by the second processor to cause the second device to, determine whether the detected login request is legitimate or an exploitation of a login vulnerability, wherein the instructions to determine whether the detected login request is legitimate or an exploitation of a login vulnerability comprise at least one of, instructions to determine second network traffic across multiple network devices having at least one attribute in common with the first network traffic and to determine whether login behavior of the first network traffic and the second network traffic has specified characteristics of a login attack;

instructions to determine whether a reputation score of a source network address of the first network traffic satisfies a malicious actor threshold, wherein the reputation score is based on login behavior of network traffic of the source network address; and instructions to determine whether a profile generated from the first network traffic matches a login attack profile; and generate a security verdict corresponding to the login request based, at least in part, on the determination of whether the login request is legitimate or an exploitation of a login vulnerability.

17. The system of claim 16, wherein the instructions to determine whether the login behavior has specified characteristics of a login attack comprise instructions to determine at least one of whether the login behavior indicates login attempts for multiple different entities from the source network address with login credentials corresponding to the detected login signature, whether the login behavior indicates multiple login attempts from the source network address for a same entity, and whether the login behavior of the first and second network traffic and login behavior of third network traffic indicates multiple login attempts for a same entity from a source network address of the second and third network traffic and a second source network address indicated as a source address for the third network traffic.

18. The system of claim 16, wherein the machine-readable medium further has stored thereon instructions executable by the processor to cause the system to maintain reputation scores of source network addresses of network traffic in which one of a plurality of login signatures was detected, wherein the instructions to maintain the reputation scores comprise instructions to update a reputation score of a network address to improve or degrade reputation as represented by the reputation score based on login behavior of network traffic observed for the network address.

19. The system of claim 16, wherein the second machine-readable medium further has stored thereon instructions to generate the first login signature, wherein the instructions to generate the first login signature comprise instructions to determine from the second network traffic a resource or service identifier corresponding to first credentials detected in the second network traffic and indicate the resource or service identifier in association with the first credentials as the first login signature.

20. The system of claim 16, wherein the second machine-readable medium further has stored thereon instructions to generate the second login signature, wherein the instructions to generate the second login signature comprise instructions to determine from the second network traffic a set of one or more login markers in a login request or login response detected in the second network traffic and indicate as the second login signature the set of login markers in association with the resource or service identifier.

* * * * *